(12) United States Patent
Duggan

(10) Patent No.: US 8,602,016 B2
(45) Date of Patent: Dec. 10, 2013

(54) BLADE

(75) Inventor: Paul Edward Duggan, Cambridge (GB)

(73) Assignee: C4 Carbides Limited, Cambridge (GB)

( * ) Notice: Subject to any disclaimer, the term of this patent is extended or adjusted under 35 U.S.C. 154(b) by 556 days.

(21) Appl. No.: 12/447,015

(22) PCT Filed: Oct. 12, 2007

(86) PCT No.: PCT/GB2007/003911
§ 371 (c)(1),
(2), (4) Date: Apr. 24, 2009

(87) PCT Pub. No.: WO2008/050088
PCT Pub. Date: May 2, 2008

(65) Prior Publication Data
US 2010/0031947 A1   Feb. 11, 2010

(30) Foreign Application Priority Data

Oct. 24, 2006   (GB) .................................. 0621150.2

(51) Int. Cl.
B28D 1/12   (2006.01)
(52) U.S. Cl.
USPC .......................................... 125/39; 125/16.01
(58) Field of Classification Search
USPC ................ 125/39, 16.01, 18; 76/112; 83/679; 451/552, 555, 558
See application file for complete search history.

(56) References Cited

U.S. PATENT DOCUMENTS

| 3,146,561 A | 9/1964 | Lindblad |
| 3,221,728 A | 12/1965 | Lindblad |
| 3,615,309 A | 10/1971 | Dawson |
| 3,626,921 A | 12/1971 | Lane |
| 3,630,699 A | 12/1971 | Catlin |
| 3,640,027 A | 2/1972 | Weiss |
| 3,894,673 A * | 7/1975 | Lowder et al. ............. 228/124.5 |
| 4,208,154 A | 6/1980 | Gundy |
| 5,495,844 A | 3/1996 | Kitajima et al. |
| 5,544,643 A | 8/1996 | Bauer et al. |
| 5,871,005 A | 2/1999 | Sueta |
| 6,098,609 A * | 8/2000 | Ishizuka ..................... 125/13.01 |
| 6,129,077 A | 10/2000 | Parini |
| 7,373,857 B2 | 5/2008 | Dion et al. |
| 2009/0056150 A1* | 3/2009 | Duggan ......................... 30/350 |

FOREIGN PATENT DOCUMENTS

| CH | 664 524 | 5/1983 |
| DE | 19 54 071 | 5/1970 |
| DE | 32 40 100 | 5/1984 |
| DE | 33 23 409 | 3/1985 |
| EP | 0 261 504 | 3/1988 |
| GB | 1 397 696 | 6/1975 |
| GB | 2 217 243 | 10/1989 |
| JP | 58-84849 | 6/1983 |
| JP | 61-76210 | 4/1986 |

(Continued)

OTHER PUBLICATIONS

Office Action dated Sep. 17, 2013 issued in U.S. Appl. No. 12/211,381, 10 pp.

*Primary Examiner* — Dung Van Nguyen
(74) *Attorney, Agent, or Firm* — Nixon & Vanderhye P.C.

(57) ABSTRACT

A blade comprises a strip having a main body portion and an edge portion. Cutting medium in the form of a diamond grit is secured to the strip by braze material. The edge portion is thinner than the main body portion.

6 Claims, 4 Drawing Sheets

(56) References Cited

FOREIGN PATENT DOCUMENTS

| | | |
|---|---|---|
| JP | 61-117070 | 6/1986 |
| JP | 61-197165 | 9/1986 |
| JP | 61-284317 | 12/1986 |
| JP | 62-193721 | 8/1987 |
| JP | 62-193775 | 8/1987 |
| JP | 63-34077 | 2/1988 |
| JP | 63-34078 | 2/1988 |
| JP | 2002-18639 | 1/2002 |
| JP | 2004-314223 | 11/2004 |
| JP | 2005-145726 | 6/2005 |
| JP | 2006-43814 | 2/2006 |
| JP | 2006-247753 | 9/2006 |
| WO | WO 01/02118 | 1/2001 |
| WO | WO 2005/075142 | 8/2005 |
| WO | WO 2005/099950 | 10/2005 |

* cited by examiner

BLADE

This application is the U.S. national phase of International Application No. PCT/GB2007/003911 filed 12 Oct. 2007 which designated the U.S. and claims priority to Great Britain Patent Application No. 0621150.2 filed 24 Oct. 2006, the entire contents of each of which are hereby incorporated by reference.

The present invention relates to blades, for example for use as bandsaw blades, jigsaw blades, hacksaw blades or handsaw blades.

An aspect of the invention provides a blade comprising a strip having a main body portion and an edge, and
    cutting medium secured to the strip along the edge,
    wherein the cutting medium is diamond secured to the strip by brazing.

The strip may have an edge portion, the cutting medium being secured to the strip along the edge portion. The edge portion may be thinner than the main body portion.

The edge portion may meet the main body portion at a step on at least one face of the strip. The edge portion may meet the main body portion at a step on both faces of the strip.

The cutting medium may be secured to the strip only on surfaces of the edge portion.

The edge portion may have a surface which meets the main body portion at two locations forming a neck between the edge portion and the main body portion, the edge portion having a convex surface between the locations. The convex surface may be a substantially continuous curved surface. The cutting medium may comprise particles of a size which is less than the radius of curvature of the convex surface.

The edge portion may have an edge face and side flanks extending from the edge face to the main body portion, the face and flanks meeting at edges extending along the strip and spaced from the main body portion. The edge face may be concave. At least one of the flanks may be concave. Both flanks may be concave. The, or at least one of the concavities, may provide a channel receiving braze material. The cutting medium may comprise particles which are sufficiently large to be received within the or a channel and to project out beyond the channel.

The main body may have at least one through aperture formed therein. There may be a plurality of through apertures spaced along the strip. At least part of the circumference of the or an aperture may be tapered in thickness to deflect cut material from the aperture.

The cutting medium may be a grit.

The blade may be a reciprocating blade. The blade may be a linear edge blade. The blade may be for a bandsaw, jigsaw, hacksaw, handsaw reciprocating saw or holesaw.

In another aspect, the invention provides a method of making a blade, comprising:
    providing a strip having a main body portion and an edge;
    providing a diamond cutting medium;
    brazing the cutting medium to the strip along the edge.

The strip may have an edge portion, the cutting medium being secured to the strip along the edge portion. The edge portion may be thinner than the main body portion.

Braze material may be applied to the edge portion before the cutting medium is introduced.

The braze material may include adhesive material for holding the braze material to the edge portion, and to hold the cutting medium prior to brazing. The strip carrying the braze material and the cutting medium may be heated to braze the cutting medium to the strip.

The strip may be formed to provide a step on at least one face of the strip, at which the edge portion meets the main body portion. A step may be formed on both faces of the strip.

The cutting medium may be secured to the strip only on surfaces of the edge portion.

The edge portion may be formed to have a surface which meets the main body portion at two locations forming a neck between the edge portion and the main body portion, and to have a convex surface between the locations. The convex surface may be a substantially continuous curved surface. The cutting medium may be provided as particles of a size which is less than the radius of curvature of the convex surface.

The edge portion may be formed to have an edge face and side flanks extending from the edge face to the main body portion, the face and flanks meeting at edges extending along the strip and spaced from the main body portion. The edge face may be formed to be concave. At least one of the flanks may be formed to be concave. Both flanks may be formed to be concave. Braze material may be provided within a channel provided by at least one of the concavities. The cutting medium may be provided as particles which are sufficiently large to be received within the or a channel and to project out beyond the or a channel.

At least one through aperture may be formed in the main body. A plurality of through apertures, spaced along the strip, may be formed in the main body. At least part of the circumference of the or an aperture is formed with a thickness taper to deflect cut material from the aperture. The cutting medium may be a grit.

The blade may be formed as a reciprocating blade. The blade may be a linear edge blade. The blade may be formed for a bandsaw, jigsaw, hacksaw, handsaw, reciprocating saw or holesaw.

Examples of the present invention will now be described in more detail, by way of example only, and with reference to the accompanying drawings, in which.

Figure 1:
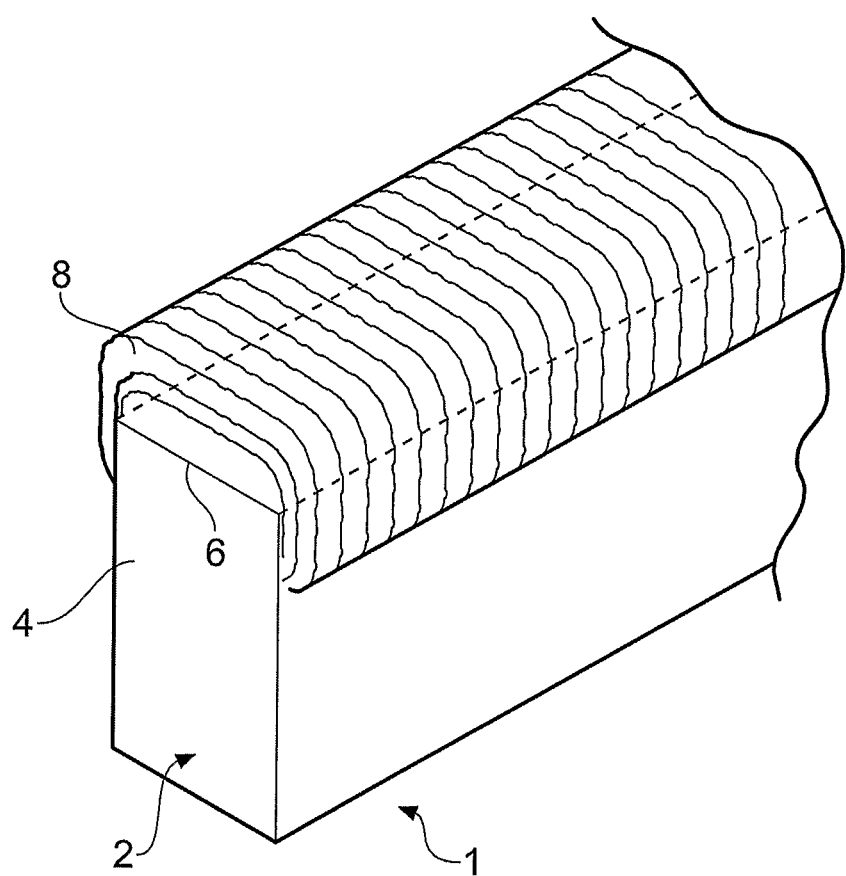
FIG. 1 is a schematic perspective view of one end portion of a blade.

FIG. 1 shows a blade 1 comprising a strip 2 having a main body portion 4 and an edge 6. Cutting medium 8 is secured to the strip 2, along the edge 6. The cutting medium 8 is a diamond grit. The diamond grit 8 is secured to the strip 2 by brazing, as will be described.

The diamond is preferably a grit of industrial diamond. Diamond grit is commonly measured by reference to mesh sizes, i.e. the smallest mesh through which the grit particles will pass. Example mesh sizes envisaged for making the blade being described, are in the range 0.1 mm to 1.5 mm mesh size.

The strip 2 may be spring steel.

The braze and brazing process will be described below, in more detail, with reference to FIG. 7.

Figure 2:
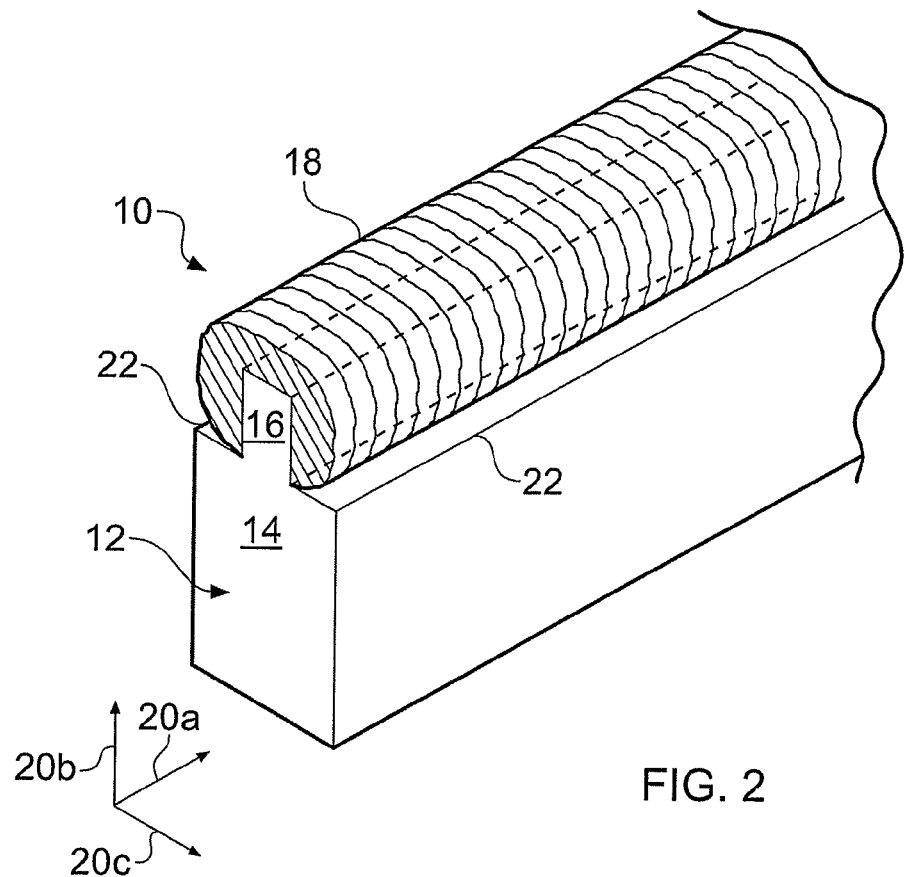
FIG. 2 is a schematic perspective view of one end portion of an alternative blade.

FIG. 2 shows a blade 10 comprising a strip 12 having a main body portion 14 and an edge portion 16. Cutting medium 18 is secured to the strip 12, along the edge portion 16. The cutting medium 18 is diamond, as described above. The grit 18 is secured to the strip 12 by brazing, as will be described with reference to FIG. 7. In this example, the edge portion 16 is thinner than the main body portion 14, as can be seen from FIG. 2.

In this example, the strip 12 has three principal dimensions illustrated at 20, namely a length 20a, a width 20b and a thickness 20c. The length 20a is much greater than the width 20b. The width 20b is greater than the thickness 20c. In this example, the thickness 20c in the main body 14 is greater than the thickness 20c in the edge portion 16, as noted above. The thickness of a blade is often called its "kerf". Accordingly, the edge portion of this example has reduced kerf, relative to the main body portion 14.

The change in thickness of the strip 12 occurs at steps 22 on the faces of the strip 12. In this example, there is a step 22 on both faces of the strip. In other examples, a step may be formed on only one face, the other face of the strip being continuous. The grit 18 is secured to the strip 12 only on surfaces of the edge portion 16.

Figure 3:
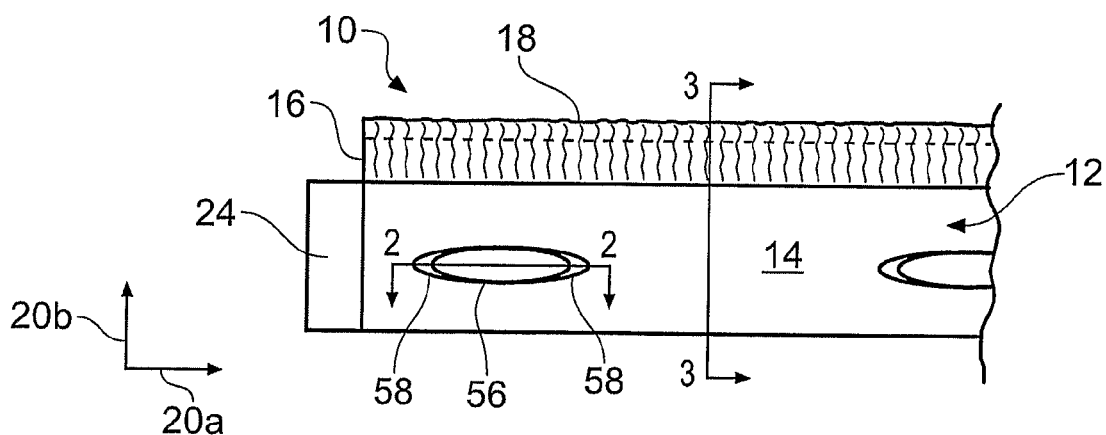
FIG. 3 is a schematic side elevation of a longer length of the end portion of the blade of FIG. 2, with fittings for mounting the blade in use.

At one or both ends of the strip 12, mountings 24, illustrated schematically in FIG. 3, may be provided to allow the blade 10 to be mounted for use, for example as a bandsaw blade, jigsaw blade, hacksaw blade or handsaw blade.

Figures 5, 6:
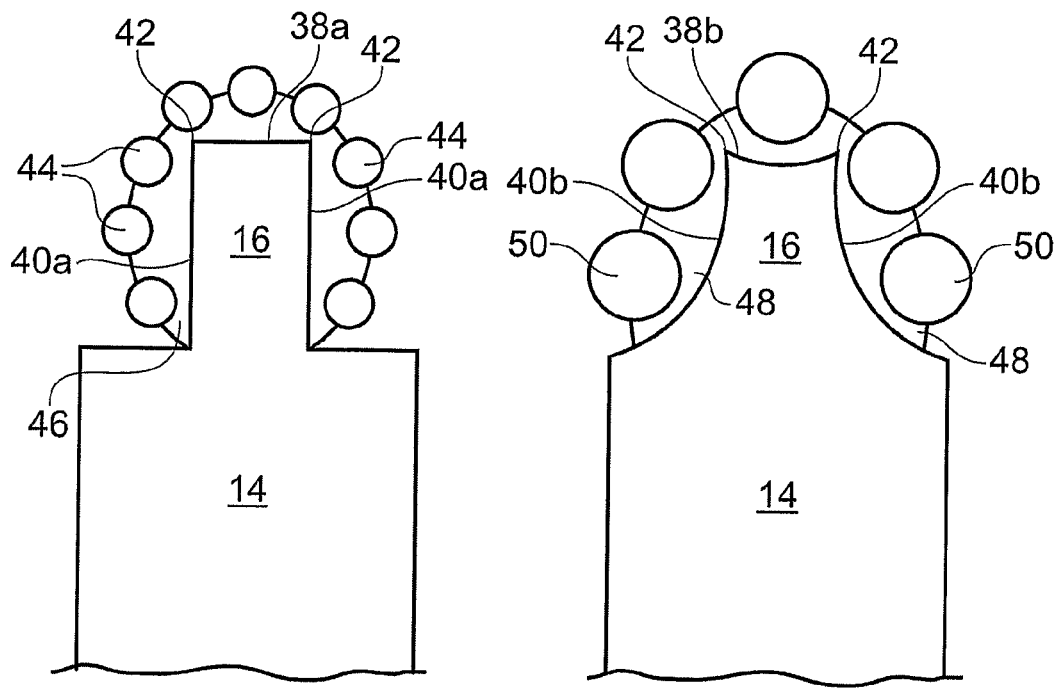
FIGS. 4 to 6 are sections along the blade at the section line 3-3, illustrating various different blade shapes.
Figure 4:
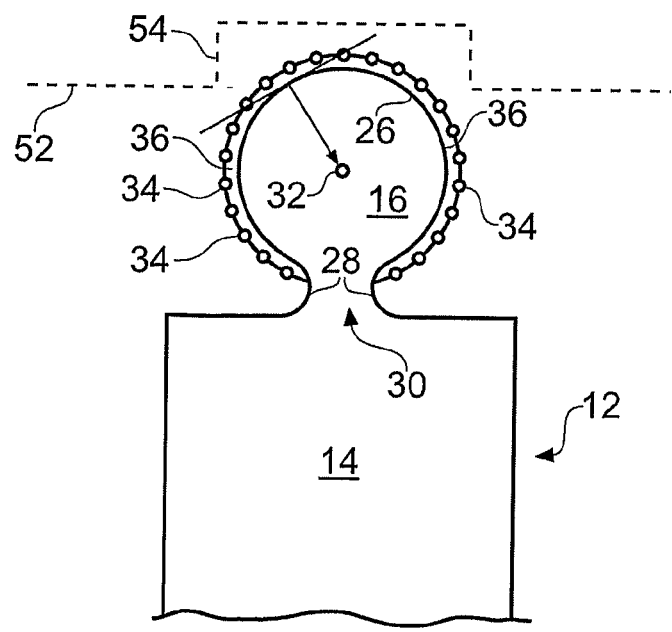

Various profiles are envisaged for the main body 14 and edge portion 16, in which the edge portion is thinner than the main body portion. Examples are illustrated in FIGS. 4 to 6. In each example, it is envisaged that the section profile is the same at substantially all positions along the blade 10. This may be achieved by rolling, milling or other operations.

In the example of FIG. 4, the edge portion 16 has a surface 26 which meets the main body portion 14 at two locations 28. The locations 28 are concave channels which form between them a neck 30 between the edge portion 16 and the main body portion 14. The surface 26 is convex between the locations 28. In this example, the convex surface 26 is a substantially continuous curved surface. That is, the surface 26 has the profile of a smooth curve, with no corners or other discontinuities.

In more geometrical terms, substantially any position on the convex surface 26 has a centre of curvature 32 which is on the same side of the surface as the material of the edge portion 16, and a radius of curvature R. The location of the centre of curvature, 32, and the size of the radius of curvature R may change from position to position, around the edge portion 16, but change smoothly and continuously, without step changes.

In this example, the grit 18 coating the surface 26 is in the form of a fine powder of particles 34 suspended in braze material 36. The particle size (such as the average diameter) is less than the radius of curvature of the surface 26. In the illustrated example, the size of the particles 34 is much less than the radius of curvature at any position on the surface 26. The convex form of the surface 26 allows relatively fine particles to be used in this manner, without edges, corners or other discontinuities on the surface 26 being exposed between particles 34. This is expected to allow the blade 10 to be used in applications which require a workpiece to be cut with curves or corners in the line of cut. The locations 28 provide channels along which swarf, cuttings or other debris can move away from the cutting face.

In the examples of FIGS. 5 and 6, the edge portion 16 has an edge face 38a, 38b and side flanks 40a, 40b which extend from the edge face 38a, 38b to the main body 14. The edge faces 38a, 38b meet the side flanks 40a, 40b at edges 42 spaced from the main body portion 14. In the example of FIG. 5, the edge face 38a and the side flanks 38b are all planar surfaces meeting at right angles at the edges 42. The face 38a and most the side flanks 40a are covered by cutting medium in the form of particles 44 held in a medium of braze material 46. In the example of FIG. 5, the particles 44 may be larger than the particles 34 of FIG. 4.

In the example of FIG. 6, the edge face 38b and both flanks 40b are concave, thereby forming shallow channels. Braze material 48 is received in the channels and grit particles 50 are embedded in the braze 48. In this example, the grit particles 50 are sufficiently large to be received within one of the channels and to project beyond the channel. Thus, the particles 50 are relatively large in comparison with the particles 44 or 34. The concavity of the face 38b and flanks 40b allows a greater depth of braze 48 to be present, improving the security with which the particles 50 are attached to the strip 12.

When the blade 10 is in use, making a cut, the edge portion 16 penetrates the workpiece 52 (illustrated in FIG. 4 only) as the grit 18 cuts into the workpiece 52, forming a shallow groove 54. It can be seen from FIG. 4 (and also from FIGS. 5 and 6) that the overall thickness (kerf) of the blade 10 in the region of the edge portion 16, including the cutting medium 18, is no greater than the thickness of the main body 14. Thus, the thickness of the cutting medium 18 is accommodated within the overall thickness of the main body 14. This reduces the amount of cutting medium required to coat the blade 10, which may be significant in view of the cost of some types of grit envisaged for use with the invention. However, the greater thickness of the main body 14, relative to the edge portion 16, improves the strength of the blade 10 in comparison with a coated blade of uniform thickness. Alternatively, the dimensions may be chosen so that the thickness of the edge portion 16 (the effective kerf of the blade) is the same as a conventional blade of uniform thickness, whereas the thickness of the main body 14 is greater than a conventional blade. This is expected to provide improved handing over a conventional blade, especially when used as a reciprocating blade. Accordingly, it is envisaged that the blades described above will provide an advantageous compromise between reduced cost of grit material, and adequate performance characteristics, particularly stiffness.

Figure 3A:
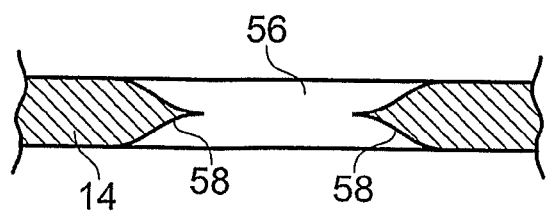
FIG. 3a is a partial section at 2-2 on an enlarged scale.

However, profiles such as those illustrated in FIGS. 4 to 7 may give rise to a difficulty in debris removal from the groove 54, particularly if the cut is sufficiently deep for the main body 14 to enter the groove 54. For this reason, a line of through apertures 56 may be provided (FIG. 3 and especially FIG. 3a), spaced along the main body 14. The apertures 56 provide a refuge for debris. In particular, for a reciprocating blade, debris may collect in an aperture 56 while that part of the blade 10 is within the groove 54, and then be released from the aperture 56 when the aperture 56 moves clear of the workpiece, as the blade reciprocates. Debris in the apertures 56 may be encouraged to leave by providing regions of the circumference of the aperture 56 with a tapered thickness, as illustrated at 58, tending to deflect debris transversely of the blade 10. Apertures like the apertures 56 can also be used in the example of FIG. 1.

The remaining drawings illustrate in simple fashion a possible manufacturing process for providing blades of the types described above.

Figures 7A, 7B, 7C, 7D:
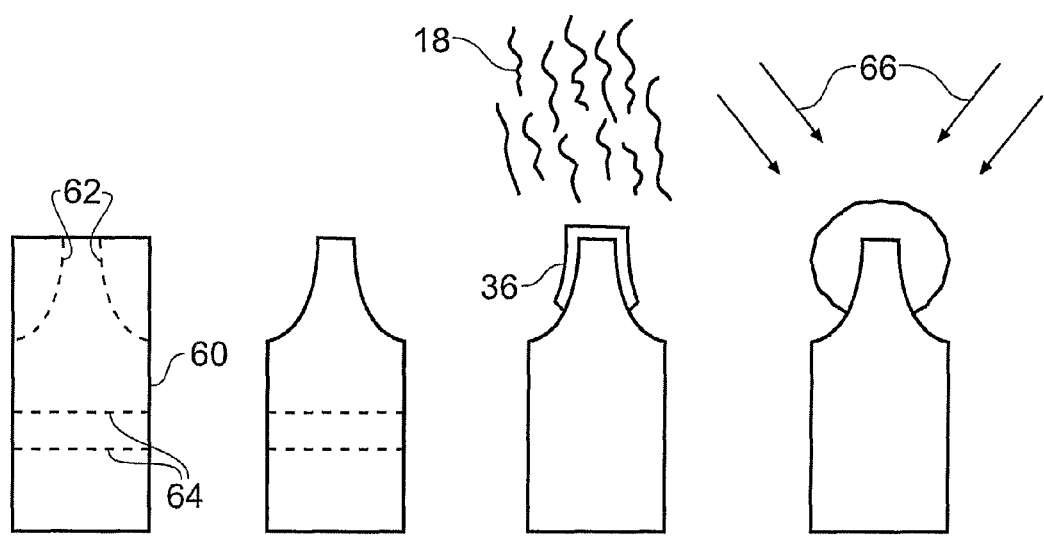
FIGS. 7a to 7d illustrate steps in the manufacture of a blade.

In FIG. 7a, a blank 60 of strip stock is provided. For the examples of FIGS. 2 to 6, the blank 60 is machined at broken lines 62 and at broken lines 64 to form the edge portion 16 and apertures 56 described above. Any of the edge profiles of FIGS. 4 to 6, or any other edge profile can be formed in this manner. The result is a blank illustrated in FIG. 6b. For the example of FIG. 1, the machining step is unnecessary, unless apertures 56 are required.

Braze material 36 is then applied to the edge portion 16, prior to the introduction of grit 18. The braze material 36 is in the form of a paste, containing a braze medium in particle form, suspended in an adhesive component which allows the braze medium to be retained temporarily in place on the edge portion 16. The braze material 36 may be a nickel-based alloy. Commercial examples include the Nicrobraze LM product of Wall Colmonoy Corp.

The adhesive material may be a starch-based paste, for example.

The adhesive material also allows diamond grit 18 to be cascaded onto the edge portion 16, sticking to the adhesive material upon contact. The result is a temporary coating of the edge portion 16, by means of the adhesive, by particles of braze medium and diamond grit. This coating is illustrated in FIG. 7d as 18a.

The coated strip 12 is then exposed to heat 66, causing the brazing process to take effect, thereby permanently securing the grit 18 to the edge portion 16. The brazing process may, for example, require the materials to be brought to a temperature in the region of about 800° C. to 1100° C. for a few seconds. This may be achieved as a continuous process, passing the strip lengthwise through an oven. The oven may contain an inert gas, such as nitrogen or argon.

In all of the examples, blades can be formed for use as bandsaw blades, jigsaw blades, hacksaw blades, handsaw blades. These are all examples of linear edge blades. Linear edge blades, in the form of strip of the type described, can be formed into holesaws. Strip of the type described can be used for reciprocating saws.

Many variations and modifications can be made to the apparatus and methods described above, without departing from the scope of the invention.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A blade comprising a strip having a main body portion and an edge portion, and
    cutting medium secured to the strip along the edge portion,
    wherein the edge portion has an edge face and side flanks extending from the edge face to the main body portion, the edge face and side flanks being planar surfaces meeting at right angles at edges thereof, the edges extending along the strip and spaced from the main body portion,
    wherein the edge portion is thinner than the main body portion, at substantially all positions along the blade,
    wherein the edge portion meets the main body portion at a step on at least one face of the strip,
    wherein the cutting medium is diamond grit secured to the strip by cascading onto the edge portion after braze material has been applied to the edge portion, and prior to heating the strip to secure the cutting medium by brazing,
    wherein the braze material is in the form of a paste, containing a braze medium in particle form, suspended in an adhesive component, and
    wherein the blade is a linear edge blade.

2. A blade according to claim 1, wherein the edge portion meets the main body portion at a step on both faces of the strip.

3. A blade according to claim 1, wherein the cutting medium is secured to the strip only on surfaces of the edge portion.

4. A method of making a blade, comprising:
    providing a strip having a main body portion and an edge portion, the main body portion and the edge portion being constructed such that the blade is a linear edge blade;
    providing a cutting medium;
    securing the cutting medium to the strip along the edge portion;
    wherein the edge portion is formed to have an edge face and side flanks extending from the edge face to the main body portion, the edge face and side flanks being planar surfaces meeting at right angles at edges thereof, the edges extending along the strip and being spaced from the main body portion,
    wherein the edge portion is formed to be thinner than the main body portion at substantially all positions along the blade,
    wherein the strip is formed to provide a step on at least one face of the strip, at which the edge portion meets the main body portion,
    wherein braze material is applied to the edge portion before the cutting medium is introduced,
    wherein the braze material is in the form of a paste, containing a braze medium in particle form, suspended in an adhesive component,
    wherein the cutting medium is diamond grit,
    wherein the cutting medium is cascaded onto the edge portion, and
    wherein the strip carrying the braze material and the cutting medium is heated to secure the cutting medium to the edge portion by brazing.

5. A method according to claim 4, wherein a step is formed on both faces of the strip.

6. A method according to claim 4, wherein the cutting medium is secured to the strip only on surfaces of the edge portion.

* * * * *